US010822263B2

(12) United States Patent
Decoster

(10) Patent No.: US 10,822,263 B2
(45) Date of Patent: Nov. 3, 2020

(54) METHOD FOR MANUFACTURING A HOLLOW GLASS ITEM

(71) Applicant: ARC FRANCE, Arques (FR)

(72) Inventor: Gregory Decoster, Mullica Hill, NJ (US)

(73) Assignee: ARC FRANCE, Arques (FR)

( * ) Notice: Subject to any disclaimer, the term of this patent is extended or adjusted under 35 U.S.C. 154(b) by 208 days.

(21) Appl. No.: 15/954,006

(22) Filed: Apr. 16, 2018

(65) Prior Publication Data

US 2018/0230037 A1    Aug. 16, 2018

Related U.S. Application Data

(63) Continuation of application No. PCT/FR2016/052915, filed on Nov. 9, 2016.

(51) Int. Cl.
  *C03B 9/32* (2006.01)
  *C03B 11/10* (2006.01)
  *C03B 23/00* (2006.01)

(52) U.S. Cl.
  CPC .......... *C03B 23/0013* (2013.01); *C03B 11/10* (2013.01); *C03B 2215/41* (2013.01); *C03B 2215/80* (2013.01)

(58) Field of Classification Search
  CPC .................................. C03B 9/32; C03B 11/10
  See application file for complete search history.

(56) References Cited

U.S. PATENT DOCUMENTS

| 1,626,739 A * | 5/1927 | Murl Lents | C03B 29/00 65/120 |
| 2,054,553 A * | 9/1936 | Ballard | C03B 9/32 65/76 |
| 8,707,735 B2 * | 4/2014 | Monden | B65D 1/00 65/79 |
| 2003/0168372 A1 * | 9/2003 | Headen | C03C 17/34 206/459.1 |

(Continued)

FOREIGN PATENT DOCUMENTS

| FR | 2975987 | 12/2012 |
| FR | 2975988 | 12/2012 |

(Continued)

OTHER PUBLICATIONS

International Search Report for International Application PCT/FR2016/052915, dated Feb. 1, 2017.

*Primary Examiner* — Cynthia Szewczyk
(74) *Attorney, Agent, or Firm* — Burris Law, PLLC

(57) ABSTRACT

The present disclosure relates to a method for manufacturing a hollow glass item and, specifically, to a method for manufacturing an item made of hollow pressed glass. The method includes a step of depositing at least one drop of molten glass into a mold intended for modelling a predetermined outer shape of the glass item to be manufactured; a step of pressing the molten glass into the mold by a shaping punch in order to shape the hollow glass item by hollowing out an inside space; a step of marking the glass item with a marking tool which is independent from the shaping punch, in order to imprint at least one raised and/or recessed pattern in the inside space of the glass item; a step of cooling the marked, pressed glass item; and a step of removing the glass item from the mold.

11 Claims, 4 Drawing Sheets

(56) References Cited

U.S. PATENT DOCUMENTS

| | | | | |
|---|---|---|---|---|
| 2014/0158659 A1* | 6/2014 | Paredes | ................ | B65D 1/0246 |
| | | | | 215/43 |
| 2015/0096913 A1* | 4/2015 | Kitchen | ................ | B65D 23/00 |
| | | | | 206/459.5 |
| 2015/0203235 A1* | 7/2015 | Laib | ................ | B65D 1/023 |
| | | | | 215/40 |
| 2016/0083280 A1* | 3/2016 | Sato | ................ | B65D 1/02 |
| | | | | 428/34.4 |

FOREIGN PATENT DOCUMENTS

| | | | | |
|---|---|---|---|---|
| FR | 2983849 | 6/2013 | | |
| WO | WO-2014196090 A1 * | 12/2014 | ............... | B65D 1/02 |

\* cited by examiner

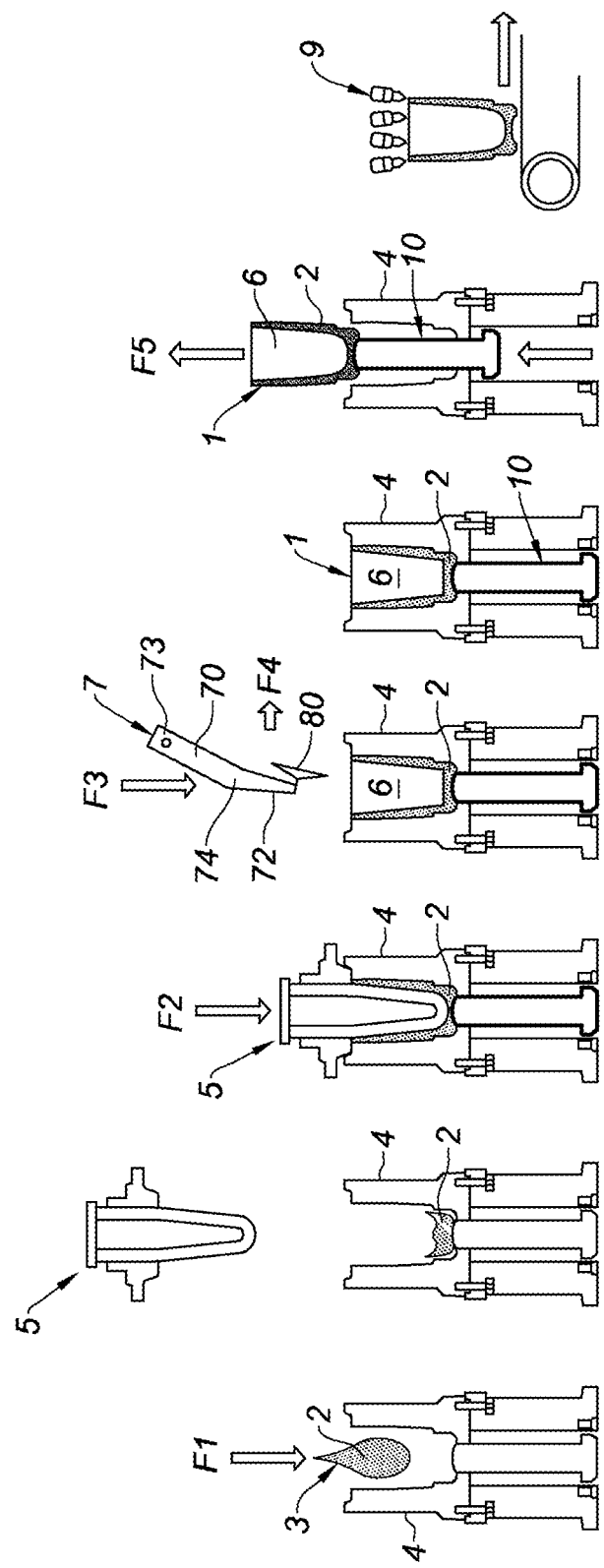

METHOD FOR MANUFACTURING A HOLLOW GLASS ITEM

CROSS-REFERENCE TO RELATED APPLICATIONS

This application is a continuation of International Application No. PCT/FR2016/052915, filed on Nov. 9, 2016, which claims priority to and the benefit of FR 15/60710 filed on Nov. 9, 2015. The disclosures of the above applications are incorporated herein by reference.

FIELD

The present disclosure relates to the process of manufacturing hollow glass items.

BACKGROUND

The statements in this section merely provide background information related to the present disclosure and may not constitute prior art.

Currently, the manufacturing of such hollow and glass items already meets with a large number of solutions. It is known, for example, a manufacturing process in which a drop of molten glass is deposited into a mold (i.e., mould) which creates the desired outer shape of the glass, the mold is then displaced under a press where a pressing step is implemented by means of a forming punch which hollows the inner volume out, the formed glass is then cooled under ventilation nozzle, and then extracted from its mold.

Nowadays, the manufacturers are increasingly looking to offer the possibility to customize most of these glass items according to the demand of their customers, this without inducing a significant additional cost during manufacture.

To customize a pressed glass, it is for example known to modify the mold so that its inner surface has a pattern allowing a customization located on the outside of the glass item to be manufactured.

Such a customization of the wall of the item is also possible by modifying the forming punch hollowing the inner volume of the item out during pressing, so that its outer wall has a pattern allowing a customization located within the glass item to be manufactured during the pressing step.

However, the customization of the mold and the forming punch is particularly expensive, in the range of tens of thousands of Euros. Consequently, the more the number of glass items to customize is low and the more the price of the item is impacted by such customization.

Of course, the customization of a forming punch is less expensive than that of a mold. However, the marking by the forming punch does not allow the same printing quality and requires the customization of the entire production.

Furthermore, it is advantageous and even necessary, to have at least one or even several mold(s) and forming punch(es) parts in reserve in order to quickly overcome a possible failure of the one and/or the other of these elements during the manufacturing of the glass items. In this context, the impact of the cost of customization of a mold and a forming punch on the unit price of a glass item is all the more significant.

Furthermore, these economic aspects also impact the minimum amount for manufacturing a series of customized glasses per order also called in Anglo-Saxon terms "Minimum Order Quantities" (MOQ) while the lowest possible MOQ is desired.

SUMMARY

The present disclosure provides a process of manufacturing a hollow glass item by pressing, simple, high quality and low cost pressing, even if the customization concerns a limited number of items.

The present disclosure provides a process of manufacturing at least one item of pressed hollow glass. The process comprises the following steps: a step of depositing at least one drop of molten glass in a mold for modeling a predetermined outer shape of the glass item to be manufactured; a pressing step of the molten glass into the mold by a forming punch to form the hollow glass item, by hollowing an inner volume out and conferring its final overall shape thereto; a step of marking the glass item by a marking tool independent of the forming punch, to print at least one relief and/or recessed pattern in the inner volume of the glass item; a cooling step of marked and pressed glass item; and a demolding step of the glass item.

Such a manufacturing process of at least one hollow glass item by pressing allows, in particular, facilitating the customization of the item during the marking step thanks to said marking tool. Indeed, the customization of a simple marking tool is very inexpensive compared to the customization of a mold or a forming punch.

Furthermore, with the marking step of the glass item being implemented by a marking tool independent of the forming punch, allows improving the printing quality of the pattern, while reducing the costs associated with the customization. Thus, during the manufacturing of several items, both steps of pressing and marking might be performed in parallel.

Moreover, such a marking step independent of the pressing stage allows an improved mastery of the production of glass items. Indeed, such a feature allows implementing said marking step independently. For example, it may be chosen to mark one glass item out of two in mass production of glass items, or even for example one out of three, four, etc.

Since the pressing step allows conferring to the glass item its final or definitive overall shape in one step, this means that other forming steps such as a blowing step, for example, are not implemented afterwards. This is unlike a pressing step which would have the only function of creating a parison. Of course, other steps such as finishing steps can be implemented later as the marking step or the burning step which can slightly modify its appearance.

This allows reducing the manufacturing time of the glass item and proceeding, in a relatively short time after the forming, with the marking of the glass before said glass could cool. This improves the printing quality of the pattern. Indeed, when the final overall shape of the item is conferred by a single forming step which is a pressing step, this allows obtaining a glass item formed with walls having a uniform thickness. This particular feature allows a more even distribution of the temperature of the walls and, consequently, a better quality marking.

Still advantageously, the marking step of the glass item is implemented when the glass has, particularly at an inner surface of its wall to be marked, a temperature between 725 and 775 degrees Celsius, and in one form is approximately equal to 750 degrees Celsius.

This temperature is particularly advantageous since it is desired that the material is soft enough to provide the printing of the customized pattern on the glass but also low enough that the marking is of high quality.

According to a particular technical feature, a marking time of the marking step is less than 0.6 seconds and in one form is less than 0.5 seconds.

In this way, the marking time is fast enough to reduce the impact on the manufacturing time of the glass item and hence on its manufacturing cost, without affecting the printing quality of the pattern on the glass.

Advantageously, the glass item, after pressing into the mold, has a thickness greater than 1 mm, and in one form the thickness is greater than 2 mm. Such a thickness allows obtaining a glass item whose walls are thin enough to be lightweight and have an improved design without particular extra costs vis-à-vis the raw material, while having walls thick enough so that the marking the glass item is of high quality without making it fragile.

According to another feature, the demolding step is followed by a burning step by burners. Such a step allows in particular clearing the glass item from its possible defects and making its glass walls smooth and shining.

To give the glass a perfect strength, it is also possible to proceed with a final heat treatment step, such as a heat strengthening and/or annealing step. The hollow glass item is therefore heated and then slowly cooled evenly. This process allows particular avoiding the tensions between the inside and the edge of the item.

According to an advantageous technical feature, the manufacturing process is implemented for the manufacturing of a plurality of glass items, the pressing and marking steps being implemented substantially concomitantly or simultaneously for distinct glass items.

Still advantageously, the marking time of the marking step is less than the pressing time of the pressing step.

In such a configuration, the marking step is carried out in masked time, during shut-down of the table for the pressing of the next glass item. This will further reduce the unit manufacturing cost of a customized glass item.

Such a manufacturing process according to the present disclosure allows a customization of glass items in small series and at low cost. Indeed, and as an illustration, the customization cost of a marking tool is a cost at least twenty times lower than the customization a forming punch and at least fifty times lower than the customization of a mold.

According to another aspect, the present disclosure also concerns a manufacturing equipment, or manufacturing unit, of at least one glass item, the equipment comprising at least: a mold intended for modeling a predetermined outer shape of the glass item to be manufactured; a forming punch; a marking tool; and a demolding tool. The equipment being noteworthy in that it is capable of implementing the manufacturing process of hollow glass items as described above.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 1A, 1B, 1C, 1D, 1E, 1F, and 1G, illustrate schematic views of different steps of a manufacturing process of a pressed and customized glass item according to the present disclosure;

Figure 2A:
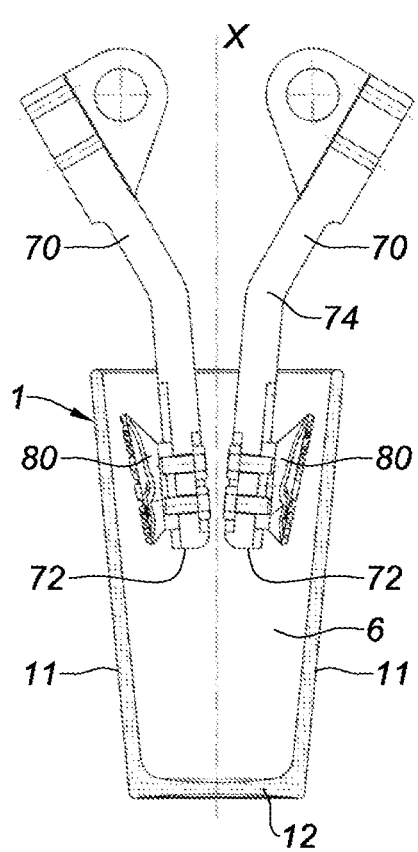
FIGS. 2A and 2B, are sectional views of a hollow glass item and a portion of a marking tool during two different phases of a marking step according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In a first deposition step illustrated in FIG. 1A, a precisely calibrated drop 3 of molten glass 2 is deposited into a mold 4 as illustrated by the arrow F1. The mold 4 is intended to model a predetermined outer shape of the glass item 1 to be manufactured.

The glass drop 3, also called "gob" has a specific mass, namely that of the final item 1 to be manufactured.

Once the drop 3 of molten glass 2 is deposited in the mold 4, said mold 4 is displaced under a forming punch 5 (see FIG. 1B) before the implementation of a pressing step (see FIG. 1C) in which the molten glass 2 deposited beforehand in the mold 4 is then pressed by the forming punch 5.

The pressing of the molten glass 2 against the mold 4 is obtained by the forming punch 5 which is lowered by translating vertically towards the mold 4 as illustrated by the arrow F2 and which penetrates an inner space of the mold 4 in order to confer the shape to the hollow glass item 1 by hollowing an inner volume 6 out. Indeed, an inner wall of the mold 4 allows defining an outer envelope to the glass item 1 to be manufactured and an outer wall to said forming punch 5 allows defining an inner envelope, complementary to the outer envelope of the mold 4, of the Item 1 to be manufactured. In this way, this pressing step allows conferring to the glass item 1 its final and hollow overall shape.

In one aspect, the mold 4 and the forming punch 5 are configured so that the glass item 1, after pressing, has a thickness greater than 1 mm and in one form has a thickness greater than 2 mm.

Subsequently to this pressing step, the glass item 1 is displaced to another manufacturing station then customized during a marking step 7 by a marking tool independent of the forming punch 5 (see FIG. 1D).

During this step, the marking tool penetrates at least partially the inner volume 6 of the glass item 1 and prints a relief and/or recessed pattern 8 against an inner surface of a wall of said glass item 1, being understood that the inner surface of the glass item 1 is a surface of the wall of the item 1 facing the side of the inner volume 6. The marking step is illustrated in detail in FIGS. 2A, 2B, 3 and 4A, 4B, and 5.

Figure 6:
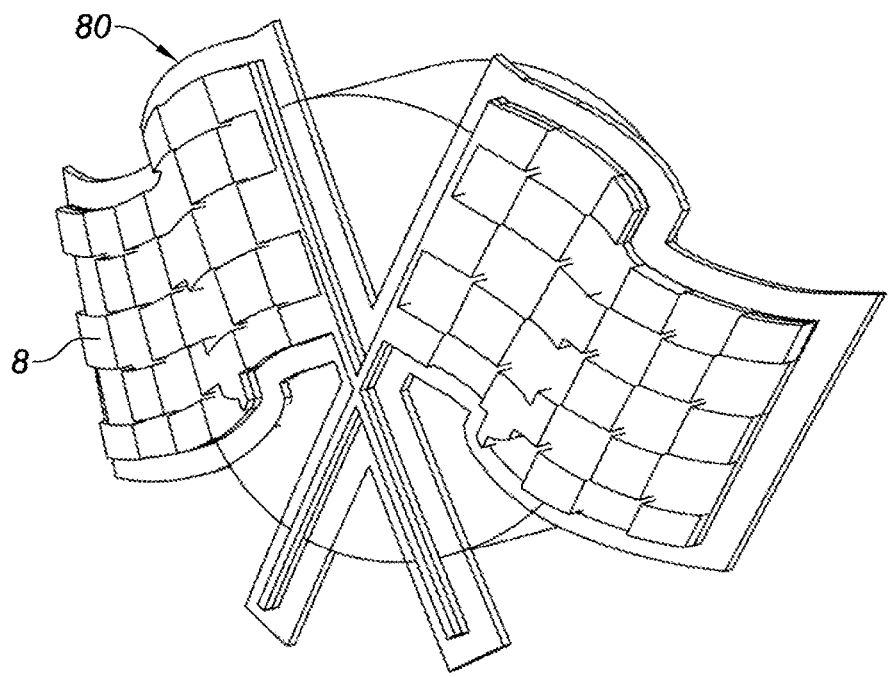
FIG. 6 is a perspective view of a customized pad of a marking tool according to one form of the present disclosure.

More specifically, the marking tool 7 comprises at least one arm 70 at the end of which is positioned a customized pad 80, this pad 80 being removable relative to said arm 70. An example of such a customized pad 80 is illustrated in FIG. 6.

In each of the various forms illustrated in FIGS. 2A, 2B, 3, 4A, 4B and 5, it will be noted that the marking tool has two arms 70, in particular here arranged so as to be each capable of marking the glass of a pattern 8 and that both patterns 8 are opposite relative to each other with respect to a vertical axis of rotation X of the glass item 1 which has a rotational symmetry.

Figure 2B:
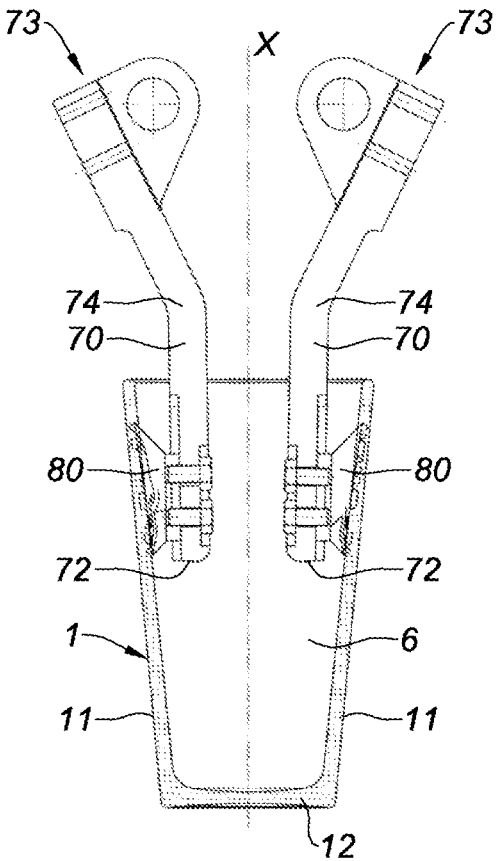
Figure 3:
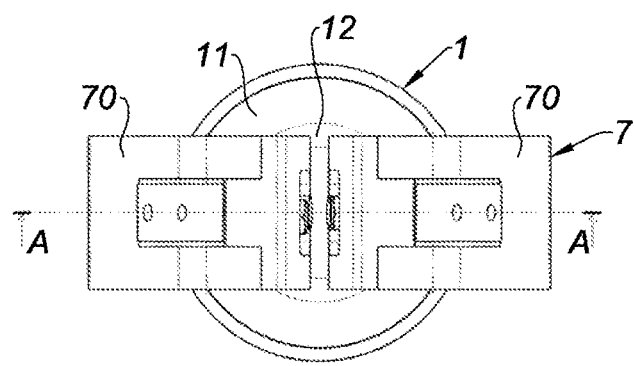
FIG. 3 is a top view of the hollow glass item and the marking tool of FIGS. 2A and 2B during the marking step.
Figure 4A:
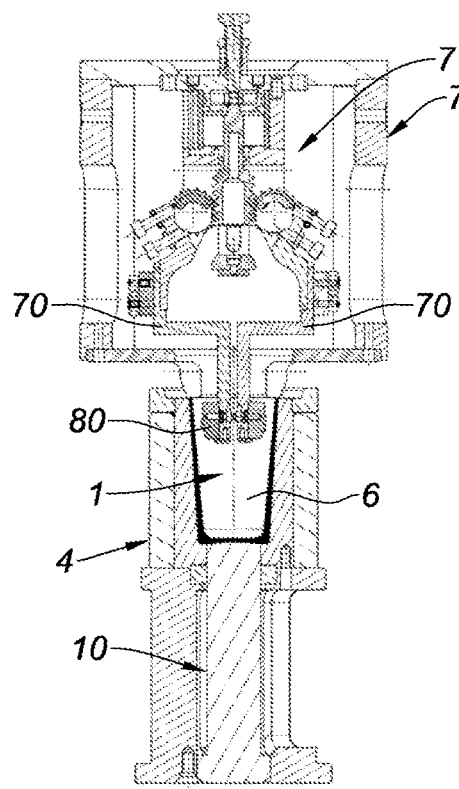
FIGS. 4A and 4B are sectional views of a hollow glass item and a marking tool during two different phases of a marking step according to another form of the present disclosure.
Figure 4B:
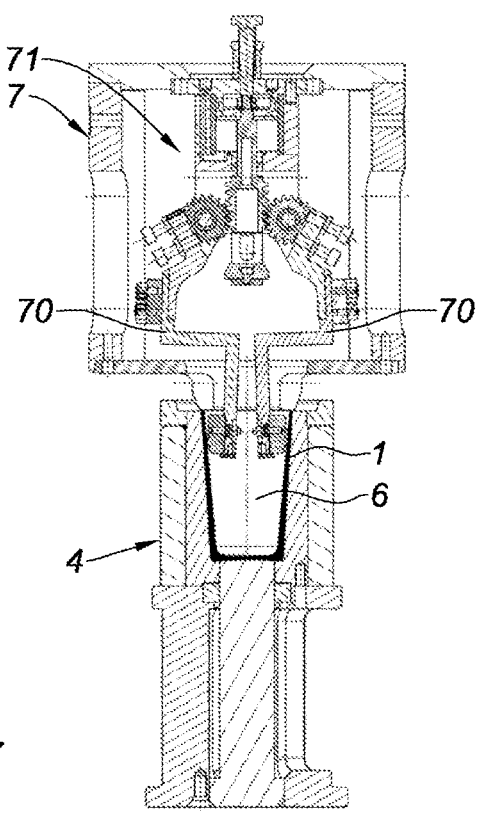
Figure 5:
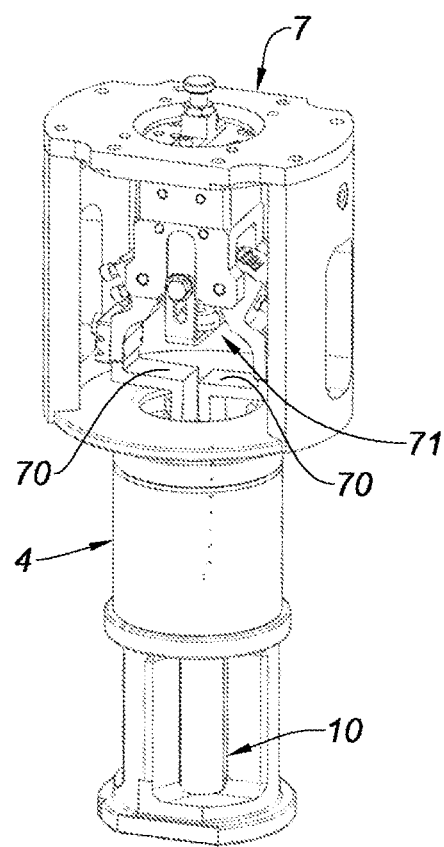
FIG. 5 is a perspective view of the marking tool of FIGS. 4A and 4B.

During this marking step, and generally, the marking tool 7 brings the pad(s) 80 in contact and in abutment against an inner surface of a wall of the glass item 1, such as a lateral wall 11 of the glass item 1, as illustrated particularly in FIGS. 2B and 4B.

In one form, the marking tool 7 is configured so that the contact is simultaneous at any point of the pattern 8 so as to improve the quality of its printing. More specifically here, the marking tool 7 performs, on the one hand, a substantially vertical movement to enter (arrow F3) the distal end 72 of each arm 70 carrying a pad 80 in the inner volume 6 of the glass item 1 as illustrated in particular in FIGS. 2A and 4A, and on the other hand, in successively and/or at least partly concomitantly, a substantially horizontal movement (F4) or substantially radial with respect to the glass item, to mark the item 1.

Once the glass is marked, that is to say once the pad 80 printed the relief and/or recessed pattern 8 in the inner volume 6 of the glass item 1 in particular on an inner surface of one of its walls 11, 12 at least, the marking tool 7 lifts the end of each arm 70 up to bring it out of the inner volume 6. In one form, in the case where the marking device comprises several arms and is arranged to print several patterns 8 on the same item 1 as is the case here, the arms 70 are driven at approximately the same time to reduce the marking time.

In this form, the substantially horizontal movement of the pad 80 is provided by rotation of the associated arm 70 but it might alternatively be driven, for example, by a translation cylinder. Here, in particular, the rotation of the arms 70 may be implemented by an actuating device 71, for example by the rotation of a worm or by the translation of a rack aligned with the axis X, the worm or the rack is mesh with one or more toothed wheel(s), each of the toothed wheels being secured to one end 73 of an arm 70 opposite to the distal end 72. In this manner, the toothed wheel, then driven in rotation, causes the movement of the distal end 72 provided with the pad 80.

Moreover, each arm 70 has at least one bend 74 between its two ends 72, 73 oriented outwardly so as to facilitate the access and the introduction of this distal end 72 into the inner volume 6 of the item 1 through its opening. This feature is particularly advantageous when the item should be printed in several patterns 8 and that several arms 70 should be implemented.

Since the manufacturing process allows mass production of glass items 1, and that the marking tool 7 evacuates the end of the arm 70 provided with the pad 80 by bringing it out of the inner volume 6 of the item 1 at each marking, it is possible to implement a pad change step 80 of the marking tool 7 between two marking steps, this without interrupting the manufacturing of the glass items.

This pad 80 changing step can be implemented in an automated manner or manually. The use of the pad 80, being sequenced, a manual change of the pad 80 has low risk for an operator who would be in charge of this step. A safety device may also be provided to inhibit an actuation of the marking tool 7 when handled by an operator during production. The unmarked glass items 1 can then be produced simultaneously during the change, without interrupting or suspending the manufacturing of the glass items.

According to an alternative, the marking tool 7 may comprise a plurality of arms, only some of which are actuated, each of said arms being provided with a different pad 80. In such an form, the pad 80 change step is implemented by selecting the desired pattern 8 and by actuating the associated arm to the pattern selected at the marking step.

Alternatively still, one arm may be provided with several pads 80, 80 each of said pads can be actuated independently relative to the each other. For example, one arm may include a different pad 80 corresponding to each letter of the alphabet and can be actuated depending on a desired combination of patterns 8 to form a word.

It will be noted that in the particular case where it is not the lateral wall 11 of the glass item 1 which is marked, but the wall 12 forming the bottom, only a substantially vertical movement of the tool of the marking tool 7 is implemented.

This marking step is performed when the glass temperature is between 725 and 775 degrees Celsius, such as around 750 degrees Celsius, to provide an improved printing quality, for a marking time of the marking step less than 0.6 seconds and in one form is less than 0.5 seconds so as not to impact the making time of a glass item 1, without deteriorating the quality of the customization.

It will be further noted that, at the marking temperature, and during the press exerted by the pad 80 on the inner surface of the glass item 1, said pad 80 stops naturally because the glass wall is cooled sufficiently when in contact with the pad 80, which may be made of metal, to provide quality printing of the pattern 8, while avoiding any deformation of the glass wall 11, 12 when printing the pattern 8. Such an advantage is also particularly advantageous when the glass item 1, after pressing, has walls 11, 12 whose thickness is greater than 1 mm and in one form is greater than 2 mm.

Advantageously, in the particular case where a plurality of items is marked with the same marking tool 7, there may be provided a cooling device of the pad 80 (not illustrated). Such a cooling device may, for example, comprise an integrated cooling circuit in the pad 80 itself, and/or also comprise one or more blowing nozzle(s) independent of the marking tool 7 and adapted for directing an air jet on the pad 80 between each marking step that said marking tool 7 implements.

In the first case, this is an example of a cooling implemented continuously, even that it can be mastered in the time of pad 80, thanks to the presence of temperature sensors. In the second case, it provides an example of a cooling implemented discontinuously, between each marking step.

Once marked or customized by the pattern 8, the glass item 1 is cooled during a cooling stage (see FIG. 1E) with ventilated air then demolded, that is to say removed from its mold 4.

The demolding is performed by a demolding tool 10 forming the ejection arm inserted through a bottom of the mold 4 to push according to the arrow F5 the item 1 formed beforehand (see FIG. 1F).

Figure 7:
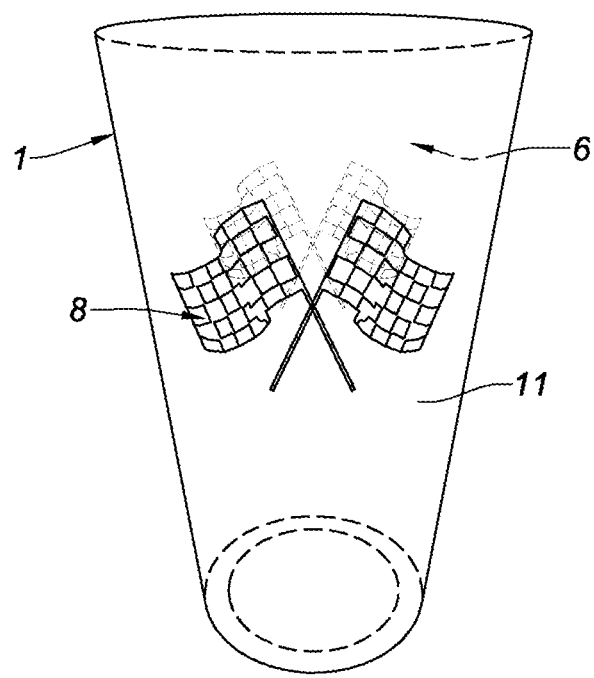
FIG. 7 is a perspective view of a customized glass item according to the present disclosure.

A burning step (see FIG. 1G) performed by burners 9 of the cooled and demolded glass item 1 allows, in particular, clearing the glass item 1 from its possible defects and making its glass walls smooth and shining. In this way, the pattern accordingly formed on the glass is also made smooth and shining as illustrated in FIG. 7.

FIGS. 1A to 1G illustrate different steps of the manufacturing process of a hollow glass item 1. It is understood that the same process can be implemented in the manufacturing of a plurality of hollow glass items 1. In this case, the pressing and marking steps are implemented in a substantially concomitantly or simultaneously for distinct glass items 1. More generally, all the steps are implemented concomitantly for distinct glass items 1, this is to speed up the production speed.

In one form, the marking time of the marking step is less than 0.5 seconds, and is also less than the pressing time of the pressing step. In this way, the marking step is carried out in masked time, during shut-down of the table supporting the mold 4 for the pressing of the next glass item.

Glass items 1 are manufactured in line or in mass production and involves the use of adapted equipment. The equipment forming manufacturing unit comprises at least: a mold 4 intended for modeling a predetermined outer shape of the glass item 1 to be manufactured; a forming punch 5; a marking tool 7; and a demolding tool 10. The equipment allows manufacturing of all these hollow glass items 1 so that each glass is manufactured according to the manufacturing process described above.

Such a device allows the subsequent manufacturing of each of the glass items 1.

More specifically, the equipment forming manufacturing unit includes a rotary table on which are successively arranged molds 4, the rotary table being indexed. Each mold is associated with a single glass item 1. Indeed, at each step, the mold moves forward and progresses in a sequenced manner performing a down-time at each step, for example before the gob, that is to say substantially in line with a distribution channel of equipment, then in line with the forming punch, then at the marking tool 7, and then at the cooling nozzles, etc.

It will be noted that in the case of the various forms as illustrated, the demolding tool 10 is associated with the mold 4 so that it follows the corresponding glass item 1 during manufacture.

In this case, the longest step involving the most downtime is the pressing step. Consequently, the marking step is not likely to slow the production speed when performed in masked time. This allows in particular reducing the unit manufacturing cost of a glass item.

The present disclosure is described above by way of example. It is understood that those skilled in the art are capable of carrying out various variants of the present disclosure without departing from the scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A manufacturing process of at least one item made of pressed hollow glass, the manufacturing process consisting of:
    depositing at least one drop of molten glass into a mold configured to model a predetermined outer shape of the at least one hollow glass item;
    pressing the at least one drop of molten glass against the mold by a forming punch such that an inner volume of the at least one hollow glass item is hollowed out and forms a final overall shape;
    marking the at least one hollow glass item by a marking tool independent of the forming punch and operable to print at least one of a relief pattern and a recessed pattern on an inner surface of the at least one hollow glass item;
    cooling the at least one hollow glass item; and
    demolding the at least one hollow glass item.

2. The manufacturing process according to claim 1, wherein the marking step is implemented when a temperature of the glass is between 725 and 775 degrees Celsius.

3. The manufacturing process according to claim 2, wherein the temperature of the glass is about 750 degrees Celsius.

4. The manufacturing process according to claim 1, wherein a marking time of the marking step is less than 0.6 seconds.

5. The manufacturing process according to claim 1, wherein a marking time of the marking step is less than 0.5 seconds.

6. The manufacturing process according to claim 1, wherein the at least one hollow glass item, after pressing, has a thickness greater than 1 mm.

7. The manufacturing process according to claim 1, wherein the at least one hollow glass item, after pressing, has a thickness greater than 2 mm.

8. The manufacturing process according to claim 1 further comprising burning the at least one hollow glass item by burners after the demolding step.

9. The manufacturing process according to claim 1, wherein a plurality of glass items are being manufactured and the pressing step and the marking step are implemented simultaneously for distinct glass items.

10. The manufacturing process according to claim 9, wherein a marking time of the marking step is less than a pressing time of the pressing step.

11. An equipment for manufacturing at least one glass item, the equipment comprising:
    a mold for modeling a predetermined outer shape of the at least one glass item;
    a forming punch;
    a marking tool independent of the forming punch; and
    a demolding tool,
    wherein the equipment is capable of manufacturing a plurality of hollow glass items according to the manufacturing process of claim 1.

* * * * *